(12) United States Patent
Leow et al.

(10) Patent No.: US 8,192,773 B2
(45) Date of Patent: Jun. 5, 2012

(54) CAROTENOID-BASED PIGMENTER

(75) Inventors: Sai-Kaw Leow, Johor (MY); Jesuadimai Ignatius Xavier Antony, Singapore (SG); Hai-Meng Tan, Singapore (SG); Sek-Yeo Ng, Singapore (SG)

(73) Assignee: Kemin Industries, Inc., Des Moines, IA (US)

( * ) Notice: Subject to any disclaimer, the term of this patent is extended or adjusted under 35 U.S.C. 154(b) by 234 days.

(21) Appl. No.: 11/962,526

(22) Filed: Dec. 21, 2007

(65) Prior Publication Data

US 2008/0199561 A1 Aug. 21, 2008

Related U.S. Application Data

(60) Provisional application No. 60/876,942, filed on Dec. 22, 2006.

(51) Int. Cl.
*A23K 1/14* (2006.01)
(52) U.S. Cl. .......................... 426/262; 426/540; 426/807
(58) Field of Classification Search .................. 426/262, 426/540, 807
See application file for complete search history.

(56) References Cited

U.S. PATENT DOCUMENTS

| | | | |
|---|---|---|---|
| 5,155,244 A | 10/1992 | Greene et al. | |
| 5,166,375 A | 11/1992 | Kameoka et al. | |
| 5,213,833 A | 5/1993 | Yamada et al. | |
| 5,380,890 A | 1/1995 | Greene et al. | |
| 5,648,564 A | 7/1997 | Ausich et al. | |
| 6,231,877 B1 | 5/2001 | Vacher et al. | |
| 7,001,611 B2 | 2/2006 | Kiso et al. | |
| 171,995 A1 | 8/2006 | Kaw et al. | |
| 2006/0171995 A1* | 8/2006 | Kaw et al. .................. | 424/442 |
| 2006/0225616 A1 | 10/2006 | Le Page et al. | |

OTHER PUBLICATIONS

A. J. Siedler, Erica Enzer, B. S. Schweigert, R. W. Riemenschineider.; Vitamin A and Carotene Stability in Feeds Containing Antioxidant Treated animal Fats; Feed Stabilisation, Dec. 1956; vol. 4, No. 12, p. 1023-1029.

Mohamed Al-Farsi, Cesarettin Alasalvar, Anne Morris, Mark Baron, Fereidoon Shahidi.; Comparison of antioxidant activity, anthocyanins, carotenoids and phenolics of three native fresh and sun-dried datwe varieties in Oman; Aug. 2005; Journal of Agricultural and Food Chemistry, vol. 53, No. 19, p. 7592-7599.

Jogn Parry, Lan Su, Marla Luther, Kequan Zhou, M. Peter Yurawecz, Paul Whittaker, Liangli Yu; Fatty acid composition and antioxidant properties of cold-pressed marionberry, boysenberry, red raspberry, and blueberry seed oils; Jan. 2005; Journal of Agricultural and Food Chemistry, vol. 53, No. 3, p. 566-573.

H. Hencken; Chemical and physiological behaviour of feed carotenoids and their effects on pigmentation; Jan.-Dec. 1992; Poultry Science, vol. 71, p. 711-717.

Pat B. Hamilton; The Use of High-Performance Liquid Chromatography for Studying Pigmentation; Jan.-Dec. 1992; Poultry Science, vol. 71, p. 718-724.

K. K. Adom, M. E. Sorrells, R. H. Liu.; Phytochemicals and antioxidant activity of milled fractions of different wheat varieties; Jan.-Dec. 2005; Journal of Agricultural and Food Chemistry, vol. 53, No. 6, p. 2297-2306.

D. Zhang, Y. Hamauzu.; Phenolic compounds, ascorbic acid, carotenoids and antioxidant properties of green, red and yellow bell peppers; Apr. 2003; Food, Agriculture & Environment, vol. 1(2), p. 22-27.

R. G. Ladron de Guevara, M. Gonzalez, M. J. Garcia-Meseguer, J. M. Nieto, M. Amo, R. Varon.; Effect of adding natural antioxidants on colour stability of paprika; Jan.-Dec. 2002; Journal of the Science of Food and Agriculture, vol. 82, p. 1061-1069.

A. E. Rolando, M. D. Gonzalez.; Chemical study of the water extract of Argentine commercial origanum; Dec. 2005; The Journal of the Argentine Chemical Society, vol. 93, No. 4-6.

Schlesier et al., "Assessment of Antioxidant Activity by Using Different in Vitro Methods. In: Free Radical Research." Feb. 2002. vol. 36 No. 2 pp. 177-187.

* cited by examiner

*Primary Examiner* — Chhaya Sayala
(74) *Attorney, Agent, or Firm* — Davis Brown Law Firm; Kent A. Herink

(57) ABSTRACT

A stabilized carotenoid-based pigmenter free of synthetic antioxidants for the addition to animal feed to add color to tissues of animals fed the animal feed. The carotenoid-based pigmenter contains free-form carotenoids obtained from natural sources through a saponification reaction. A natural antioxidant, such as grape seed extracts, green tea extracts, clove bud oil, clove leaf oil, Vitamin C, cinnamon leaf oil, oleoresin turmeric, tocopherol, tocotrienol, rosemary extracts and gallic acid or salts thereof combined with a diluent, preferably glycerol or a glycerol-like substance, is added to the pigmenter after the saponification reaction.

6 Claims, No Drawings

CAROTENOID-BASED PIGMENTER

This application claims priority to U.S. Patent Application Ser. No. 60/876,942, filed Dec. 22, 2006.

BACKGROUND OF THE INVENTION

The present invention relates generally to carotenoid-based pigmenters and, more specifically, to a carotenoid-based pigmenter that is stabilized against oxidation by a natural antioxidant.

Appearance is one of the important criteria for the selection of foods by consumers. The enhancement of the color of dressed chickens and egg yolks is a result of increasing the carotenoids in the feed. Pigmenter products, including carotenoid-based pigmenter products, are subject to oxidation. Synthetic antioxidants such as ethoxyquin, butylated hydroxyanisole (BHA), and butylated hydroxytoluene (BHT) are often introduced into the final pigmenter product for stabilization purposes. Ethoxyquin is one of the most common synthetic antioxidant used in food and feed applications. A popular carotenoid-based pigmenter uses ethoxyquin as the antioxidant to protect the carotenoids against oxidation. However, the use of ethoxyquin remains a controversial subject due to the purported health concerns especially on pets. Recently, the Japanese government has started efforts looking at possibly replacing the ethoxyquin with alternative antioxidants preferably from natural sources.

SUMMARY OF THE INVENTION

Novel carotenoid-based pigmenter compositions were developed using gallic acid combined with glycerol or glycerol-like substances as the antioxidant. The new compositions were compared against an existing carotenoid-based pigmenter product which used a synthetic antioxidant for the stability of the carotenoids and maintenance of pigmentation efficacy. The new pigmenter compositions were found to be as effective on the stability of the carotenoids, and specifically trans-capsanthin, as the pigmenter product stabilized with a synthetic antioxidant ($P>0.05$). The pigmentation efficacy of both products was comparable.

DETAILED DESCRIPTION OF PREFERRED EMBODIMENTS

Virtually all carotenoid-based pigmenters in the commercial market place contain carotenoids extracted from natural sources. Most carotenoids are present in natural sources in esterified form where the carotenoid is combined with an ester. To obtain the free form of the carotenoid, a saponification step is performed, typically using a strong alkali. In the process for forming the improved pigmenter products from natural sources using gallic acid as the antioxidant, the gallic acid must be added after the saponification step. Further, it is necessary that the gallic acid be added together with a diluent, preferably glycerol or a glycerol-like substance, to assist in dispersal of the gallic acid through the pigmenter product and improve the efficacy of the gallic acid in protecting the carotenoid-based pigmenter product against oxidation. Another benefit of the improved pigmenters is that the efficacy of the pigmenter in adding color to animal tissues is not adversely affected by the use of the natural antioxidant system.

This invention consists of an antioxidant system, which incorporates natural antioxidant compounds (such as grape seed extracts, green tea extracts, clove bud oil, clove leaf oil, Vitamin C, cinnamon leaf oil, oleoresin turmeric, tocopherol, tocotrienol, rosemary extracts and gallic acid) into solid and liquid formulations. As the natural antioxidant molecule may have limited solubility in the pigmenter products, natural diluents such as benzyl alcohol, glycerol and water were selected as the carrier to enhance the dispersion of the natural antioxidant molecule into the pigmenter products. Our results have indicated that when gallic acid is used as the natural antioxidant added to the pigmenter, the amount of gallic acid is between 0.01 and 5 weight percent, preferably between 0.1 and 3 weight percent, and more preferably between 0.5 and 2 weight percent. The diluent is added to the pigmenter in an amount between 0.5 and 15 weight percent, preferably between 1 and 10 weight percent, and more preferably between 2 and 8 weight percent. The combination of approximately 1% of gallic acid with 4% glycerol exhibited the best antioxidant potency. In addition, the stability data revealed that this product was stable up to 9 months. In our studies, we discovered that the sequence of adding the natural antioxidant into the process is very critical. The natural antioxidant has to be dissolved in the diluent for dispersion into the saponified pigment to act as the antioxidant. Furthermore, when using gallic acid in glycerol, the solution has to be added after the saponification step to avoid neutralization of gallic acid by the alkaline and to maintain the requisite degree of saponification.

In addition, the semi-synthetic antioxidants such as propyl gallate, octyl gallate, dodecyl gallate and ascorbyl palmitate exhibit similar antioxidant properties with gallic acid and can be used within the scope of this invention. Other synthetic diluents can be used are monopropylene glycol, polyethylene glycol and alcohol-like solvents. Glycerol-like compounds include compounds wherein one of more of the hydrogen moieties of glycerol are substituted with a different moiety and wherein the substituted compound still exhibits good dispersion of the antioxidant when added to the carotenoid-based pigmenter.

EXAMPLE

Materials and Methods

All chemicals and reagents used in the analytical protocols were of analytical reagent grade. Commercial food grade gallic acid, ethoxyquin, glycerol, propylene glycol, potassium hydroxide, wheat bran and silica were used in the product development studies.

Carotenoids Assay. A sample of 0.5 g (+/−0.1 mg) is added to a 100 ml brown volumetric flask. The flask is filled with HEAT (hexane:ethanol:acetone:toluene—10:6:7:7) as the extracting solvent and stirred with a magnetic stir bar for 15 min. Five ml is transferred by pipette to a 50 ml brown volumetric flask, diluted to the mark with HEAT, and shaken to mix the contents. A cuvette of a UV-visible spectrophotometer is filled with the solution and absorbance is measured at 460 nm against the extracting solvent. Note that the amount of the sample may need to be adjusted if the absorbance is not between 0.3 and 0.7. The total carotenoids is given by the following formula, where $A_{460}$ is the absorbance at 460 nm:

$$\text{Total Carotenoids(g/kg)} = [A_{460} \times 4.426]/\text{Sample weight}$$

Trans-Capsanthin Assay. A sample of 0.4 g (+/−0.1 mg) is added to a 100 ml brown volumetric flask. To the flask is added 30 ml HEAT (hexane:ethanol:acetone:toluene—10:6:7:7) as the extracting solvent and the flask is sonicated for 1 min. One ml distilled water and 2 ml of 40% KOH-methanol are added to the flask. An air condenser is connected to the flask and the flask is heated in a 56° C. water bath for 20 min.

The contents of the flask are transferred to a first 300 ml separating funnel and washed with 30 ml of extracting solvent and 40 ml of 3% $Na_2SO_4$ solution. The first separating funnel is shaken for 30 sec and set aside for separation. When separation has occurred, the lower aqueous layer in the first funnel is transferred to a second 300 ml separating funnel and 30 ml of the extracting solvent is added. The second separating funnel is shaken for 30 sec and set aside for separation. When separation has occurred, the lower aqueous layer in the second funnel is discarded and the upper, organic layers from the two separating funnels is combined in one of the funnels. Fifty ml of 3% NaCl is added and the funnel is shaken for 30 sec and set aside to allow separation. The lower aqueous layer is discarded. The remaining layer is washed with 50 ml of distilled water and the lower aqueous layer is discarded after separation. An extra wash may be required if the lower layer is not neutral, as determined by a few drops of 1% phenolphthalein solution. The top organic layer is transferred to a 100 ml brown volumetric flask and the flask is filled to the mark with the extracting solvent. Two ml is transferred by pipette to a 50 ml round bottom flask and the solution is evaporated to dryness in a rotary evaporator. A mobile HPLC phase is created by adding 63 ppm analytical grade α-tocopherol to HPLC grade hexane and combing the hexane with HPLC grade acetone is a ratio of 81:19 hexane:acetone. Two ml of the mobile phase is added to the round bottom flask and the solution is again evaporated to dryness. Two ml of the mobile phase is added and the solution is injected into the HPLC (Shimadzu CLC-SIL(M); 1.1 ml/min flow rate; detection at 474 nm; 20° C.; 20 μl injection volume). The amount of trans-capsanthin is given by the following formula:

Total Trans-capsanthin=Total Carotenoids×% area from the chromatogram

Ethoxyquin Assay. Add 1 g (+/−0.1 mg) into a stoppered 50 ml conical flask. Add 10 ml of solvent (0.1 g BHT in 1 l methanol) and sonicate for 30 min. Filter the solution using No. 4 paper and collect the filtrate in 100 ml round bottom flask. Thoroughly rinse the conical flask and the filter paper with 50 ml of the solvent. Collect all of the filtrate in the round bottom flask and dry using a vacuum distillation apparatus with two gas traps, the first filled with silica and the second with anhydrous calcium chloride. Dissolve the dried sample in 5 g of a second solvent (1:1 acetonitrile:methanol; 0.05 g BHT per liter). Filter the sample through a 0.2 μm disc filter. An ethoxyquin standard is prepared by dissolving 0.01 g of ethoxyquin in 10 g of the second solvent and using serial dilution to reach 0.1 ppm ethoxyquin. The sample and the ethoxyquin standard are injected into the HPLC (C18, 5 μm, 4.6×250 mm; 40° C.; $CH_3CN:H_2O$ (75:25) mobile phase; 1 ml/min flow rate; 20 μl injection volume; spectrofluorometer, Ex 360 nm, Em 435 nm) using the sequence standard, sample, standard. The amount of ethoxyquin is given by the following formula, where $SA_{ave}$ is the average of two standard peak areas from the HPLC chromatogram, Sample Area is the area of the sample peak from the HPLC chromatogram, and $EQ_{std}$ is the amount of ethoxyquin (ppm) in the standard:

Ethoxyquin in sample(ppm)=Sample Area×$EQ_{std}$/5×$SA_{ave}$

Antioxidant Assay. The screening of antioxidant molecules was done using the DPPH (2,2-diphenyl-1-picrylhydrazyl) method. A standard 0.1 mM DPPH homogeneous solution was prepared in ethanol under sonication. The absorbance of this standard solution was measured in a Shimadzu spectrophotometer (Model UV-2401PC) at 517 nm against the ethanol blank. A 100-ppm homogeneous test sample solution was prepared by dissolving the sample in ethanol. The solution was sonicated for five minutes to ensure the complete dissolution of test sample in ethanol. 1 ml of this sample solution was pipetted into a test tube and diluted to 10 ml using ethanol. The absorbance of this test solution was measured at 517 nm against an ethanol blank. 2 ml of the standard 0.1 nM DPPH solution was taken into a test tube and 0.1 ml of the test sample was added. The mixture was vortexed for 1 minute and left to stand for 15 minutes before the absorbance was measured at 517 nm against an ethanol blank. The percentage oxidation inhibition was calculated as below:

% Oxidation inhibition=$[(1-(A_{spl}-A_{bkg}))/A_{ctl}]×100$;

where $A_{spl}$ is the absorbance of test sample solution after 15 minutes of reaction with DPPH, $A_{bkg}$ is the absorbance of 100-ppm test sample solution, and $A_{ctl}$ is the absorbance of standard 100 ppm DPPH solution.

The pigmentation efficacy of the new product was tested using 44-week old Lohman LSL Classic layer birds. There were 20 birds per treatment. The duration of the trial was 24 days. The dose of pigment products in the feed was 0.14%. Ten eggs per treatment were collected after the 24-day trial and analyzed for the Roche color fan (RCF) score.

GraphPad Prism (San Diego, US), Version 3.02, software was employed for the statistical analysis.

Results and Discussion

Four experimental pigmenter formulations containing 2.55 g/kg trans-capsanthin were made with 0.8%, 1.1%, 1.5% and 2.0% gallic acid, respectively, using Kem GLO®, a dry stabilized source of red carotenoids, including trans-capsanthin, from saponified paprika extract and sold by Kemin Industries (Asia) Pte Limited (Singapore). The stability of the carotenoids in these formulations was tested both at 75° C. and at room temperature in open bags.

Table 1 gives the stability of carotenoids of these experimental formulations in the stressed condition at 75° C. The results showed no significant difference between the formulations with different gallic acid concentrations (P>0.05).

TABLE 1

Retention of carotenoids in experimental carotenoid-based pigmenter formulations with different gallic acid (GA) concentrations stored at 75° C.

| Time/ hrs | Pigmenter with 0.8% GA | | Pigmenter with 1.1% GA | | Pigmenter with 1.5% GA | | Pigmenter with 2.0% GA | | Pigmenter with EQ | |
|---|---|---|---|---|---|---|---|---|---|---|
| | Total Carotenoids (g/kg) | % Retention | Total Carotenoids (g/kg) | % Retention | Total Carotenoids (g/kg) | % Retention | Total Carotenoids (g/kg) | % Retention | Total Carotenoids (g/kg) | % Retention |
| Initial | 6.64 | 100 | 6.85 | 100 | 7.09 | 100 | 6.66 | 100 | 6.72 | 100 |
| 24 | 5.59 | 84.19 | 5.84 | 85.26 | 6.03 | 85.05 | 5.50 | 82.58 | 6.52 | 97.02 |

TABLE 1-continued

Retention of carotenoids in experimental carotenoid-based pigmenter formulations with different gallic acid (GA) concentrations stored at 75° C.

| Time/ hrs | Pigmenter with 0.8% GA | | Pigmenter with 1.1% GA | | Pigmenter with 1.5% GA | | Pigmenter with 2.0% GA | | Pigmenter with EQ | |
|---|---|---|---|---|---|---|---|---|---|---|
| | Total Carotenoids (g/kg) | % Retention | Total Carotenoids (g/kg) | % Retention | Total Carotenoids (g/kg) | % Retention | Total Carotenoids (g/kg) | % Retention | Total Carotenoids (g/kg) | % Retention |
| 48 | 4.35 | 65.51 | 4.54 | 66.28 | 4.59 | 64.74 | 4.30 | 64.56 | 5.79 | 86.16 |
| 72 | 3.16 | 47.59 | 3.49 | 50.95 | 3.65 | 51.48 | 3.32 | 49.85 | 5.20 | 77.38 |

In the other stress test, conducted at room temperature but in open bags, the results showed no significant difference ($P>0.05$) between the gallic acid and ethoxyquin formulations (Table 2).

TABLE 2

Retention of carotenoids and trans-capsanthin in pigmenter formulations with ethpxyquin and gallic acid at room temperature in open bags

| Days | Pigmenter with 4% ethoxyquin | | | | Pigmenter with 0.8% gallic acid | | | |
|---|---|---|---|---|---|---|---|---|
| | Total carotenoids (g/kg) | % Retention | Total Capsanthin | % Retention | Total carotenoids (g/kg) | % Retention | Total Capsanthin | % Retention |
| Initial | 7.21 | 100 | 3.16 | 100 | 6.72 | 100 | 3.12 | 100 |
| 16 | 7.45 | 103.30 | 3.08 | 97.47 | 6.31 | 93.90 | 2.9 | 93.00 |
| 32 | 7.21 | 100% | 3.04 | 96.20 | 6.27 | 93.30 | 2.89 | 92.63 |

Another pigmenter composition was formulated having 3.8 g/kg trans-capsanthin and stabilized with 1.1% gallic acid. This composition was subjected to a real-time stability study in closed bags along with regular Kem GLO® (stabilized with ethoxyquin) and a similar formulation without an antioxidant. The results (Table 3) showed that the stability of total carotenoids and trans-capsanthin in the Kem GLO® formulation without antioxidant was significantly lower than the other two formulations containing either ethoxyquin or gallic acid ($P<0.05$), and that the latter two products were not significantly different in stability ($P>0.05$).

TABLE 3

Retention of total carotenoids and trans-capsanthin in pigmenter formulations without antioxidant, with gallic acid or ethoxyquin (EQ)

| | Pigmenter without antioxidant | | | Pigmenter with gallic acid | | | Pigmenter with EQ | | |
|---|---|---|---|---|---|---|---|---|---|
| | Initial | 5 months | % Retention | Initial | 5 months | % Retention | Initial | 5 months | % Retention |
| Total carotenoids g/kg | 10.43 | 4.41 | 42.28[a] | 10.08 | 8.67 | 86.01[b] | 10.98 | 9.84 | 89.62[b] |
| Trans-capsanthin g/kg | 3.68 | 1.77 | 48.10[a] | 4.48 | 4.15 | 95.09[b] | 3.87 | 4.02 | 103.88[b] |

[a,b]Rows with no common superscripts differ significantly ($P < 0.05$)

The experimental composition containing 3.8 g/kg trans-capsanthin and stabilized with 1.1% gallic acid was subjected to a pigmentation efficacy trial along with Kem GLO® products (with and without ethoxyquin), and a publicly available dry carotenoid-based pigmenter product also with the same trans-capsanthin content (Kokhin, Japan). All treatments received the same level (0.14%) of pigment in the feed. The results of the RCF scores for the different treatments showed that the yolk from layers receiving the experimental pigmenter composition containing gallic acid achieved a RCF score of more than 13. There was no significant difference noted on egg production, egg weight and eggshell strength among the different treatments.

CONCLUSIONS

From the present study it was found that gallic acid could replace ethoxyquin as an antioxidant in dry carotenoid-based pigmenter product and provide a good protection for the carotenoids, including trans-capsanthin, against oxidation.

The stability of carotenoids and trans-capsanthin in the new product with gallic acid was comparable to the existing product stabilized with the synthetic antioxidant ethoxyquin ($P>0.05$). The efficacy trial showed that the new product was able to give the desired RCF score of 13 in the egg yolk.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:

1. A stabilized carotenoid-based pigmenter for the addition to animal feed to add color to tissues of animals fed the animal feed, comprising:
    (a) a carotenoid-based pigmenter containing free-form carotenoids obtained from natural sources through a saponification reaction; and
    (b) a natural acidic antioxidant selected from the group consisting of grape seed extracts, green tea extracts, clove bud oil, clove leaf oil, Vitamin C, cinnamon leaf oil, oleoresin turmeric, tocopherol, tocotrienol, rosemary extracts, and gallic acid or salts thereof combined with glycerol or an alcohol and added to the pigmenter after the saponification reaction.

2. A pigmenter as defined in claim 1, wherein the pigmenter contains between about 0.01% and about 20% carotenoids by weight.

3. A pigmenter as defined in claim 1, wherein the gallic acid or salts thereof are between about 0.01% and about 5% of the pigmenter by weight.

4. A pigmenter as defined in claim 1, wherein the antioxidant is gallic acid or salts thereof and the diluent is glycerol or an alcohol and the ratio of gallic acid or salts thereof to glycerol or glycerol-like substances is between about 0.1 to about 2, and preferably between about 0.2 and 1.5.

5. A method of adding color to the tissues of an animal, comprising the steps of:
    (a) extracting one or more esterified carotenoids from a natural source;
    (b) saponifying the extract to produce a pigmenter having free-form carotenoids;
    (c) combining gallic acid or salts thereof with glycerol or an alcohol to produce a solution of a natural acidic antioxidant;
    (d) adding the solution of the natural acidic antioxidant to the pigmenter to produce a stabilized pigmenter;
    (e) adding the stabilized pigmenter to an animal feed; and
    (f) feeding the animal feed to an animal.

6. A method as defined in claim 5, wherein the color added to the tissues of the animal is equivalent to that from feeding an equal amount, on a carotenoid basis, of the pigmenter stabilized with a synthetic antioxidant.

* * * * *